(12) United States Patent
Hwang et al.

(10) Patent No.: US 9,401,885 B2
(45) Date of Patent: *Jul. 26, 2016

(54) DATA PUSH SERVICE METHOD AND SYSTEM USING DATA PULL MODEL

(71) Applicant: SAMSUNG ELECTRONICS CO., LTD., Gyeonggi-do (KR)

(72) Inventors: Sang-chul Hwang, Suwon-si (KR); Won-joo Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/722,934

(22) Filed: Dec. 20, 2012

(65) Prior Publication Data

US 2013/0110935 A1 May 2, 2013

Related U.S. Application Data

(63) Continuation of application No. 11/542,111, filed on Oct. 4, 2006, now Pat. No. 8,352,931.

(30) Foreign Application Priority Data

Oct. 4, 2005 (KR) .................. 10-2005-0093070

(51) Int. Cl.
G06F 9/44 (2006.01)
H04L 12/58 (2006.01)
H04L 12/24 (2006.01)
H04L 29/06 (2006.01)
H04L 12/18 (2006.01)
G06F 9/445 (2006.01)

(52) U.S. Cl.
CPC ...... *H04L 51/18* (2013.01); *G06F 8/70* (2013.01); *H04L 29/06* (2013.01); *H04L 41/509* (2013.01); *G06F 8/60* (2013.01); *H04L 12/18* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,923,756 A | 7/1999 | Shambroom | |
| 6,041,359 A | 3/2000 | Birdwell | |
| 6,119,167 A * | 9/2000 | Boyle | H04L 12/18 709/203 |
| 6,259,442 B1 * | 7/2001 | Britt, Jr. | G06F 17/30 714/807 |

(Continued)

FOREIGN PATENT DOCUMENTS

| | | |
|---|---|---|
| CN | 1468401 A | 1/2004 |
| CN | 101071424 A | 11/2007 |

(Continued)

OTHER PUBLICATIONS

Communication dated Nov. 30, 2012 issued by the State Intellectual Property Office of P.R. China in counterpart Chinese Patent Application No. 200610172986.6.

(Continued)

*Primary Examiner* — Hiren Patel
(74) *Attorney, Agent, or Firm* — Sughrue Mion, PLLC

(57) ABSTRACT

A data push service method and system are provided. The service data push method includes: providing a device with data push information regarding service data to be pushed to at least one device; and pushing the service data to the device when receiving a data push service request from the at least one device. Accordingly, the server does not need to maintain and manage information of the at least one device.

16 Claims, 5 Drawing Sheets

(56) References Cited

U.S. PATENT DOCUMENTS

| | | | |
|---|---|---|---|
| 6,345,296 B1* | 2/2002 | McCrory et al. | 709/228 |
| 6,421,781 B1 | 7/2002 | Fox et al. | |
| 6,795,864 B2 | 9/2004 | Connor | |
| 7,058,691 B1 | 6/2006 | Yu et al. | |
| 7,100,158 B2* | 8/2006 | Nakane et al. | 717/172 |
| 7,194,757 B1* | 3/2007 | Fish | G06Q 10/10 348/E7.07 |
| 7,203,760 B2* | 4/2007 | Shimada | H04L 29/06 709/235 |
| 7,251,695 B2* | 7/2007 | Khodko | H04L 29/06 709/227 |
| 7,257,583 B2* | 8/2007 | Hofmeister et al. | |
| 7,295,550 B2 | 11/2007 | Shimba et al. | |
| 7,516,135 B2 | 4/2009 | Bayyapu | |
| 7,523,145 B2* | 4/2009 | Willard | H04L 41/0816 386/239 |
| 7,548,985 B2* | 6/2009 | Guigui | 709/231 |
| 7,617,525 B1 | 11/2009 | Moeck et al. | |
| 7,624,375 B2* | 11/2009 | Santori et al. | 717/121 |
| 2002/0035597 A1 | 3/2002 | Khodko et al. | |
| 2002/0052957 A1 | 5/2002 | Shimada | |
| 2002/0073245 A1 | 6/2002 | Hallford | |
| 2002/0083157 A1* | 6/2002 | Sekiguchi | H04L 12/1859 709/219 |
| 2002/0110123 A1 | 8/2002 | Shitama | |
| 2002/0152472 A1* | 10/2002 | Istvan et al. | 725/117 |
| 2002/0178289 A1 | 11/2002 | Kurose | |
| 2003/0065738 A1* | 4/2003 | Yang | G06F 8/65 709/215 |
| 2003/0084108 A1 | 5/2003 | Syed | |
| 2003/0084140 A1 | 5/2003 | Takeuchi et al. | |
| 2003/0093476 A1 | 5/2003 | Syed | |
| 2003/0115348 A1* | 6/2003 | Ohashi | H04L 29/06 709/230 |
| 2003/0212772 A1 | 11/2003 | Harris | |
| 2004/0015926 A1* | 1/2004 | Antonov et al. | 717/155 |
| 2004/0068363 A1 | 4/2004 | Goto | |
| 2004/0078474 A1 | 4/2004 | Ramaswamy | |
| 2004/0125801 A1 | 7/2004 | Nawata | |
| 2004/0181575 A1 | 9/2004 | Mallberg et al. | |
| 2004/0205233 A1* | 10/2004 | Dunk | H04L 29/12066 709/238 |
| 2004/0243617 A1 | 12/2004 | Bayyapu | |
| 2005/0063329 A1 | 3/2005 | Lee et al. | |
| 2005/0102662 A1* | 5/2005 | Samsalovic | G06F 8/65 717/168 |
| 2005/0108397 A1 | 5/2005 | Basso et al. | |
| 2005/0114380 A1* | 5/2005 | Eldar | G06Q 50/22 |
| 2005/0125533 A1 | 6/2005 | Svanbro et al. | |
| 2005/0131999 A1 | 6/2005 | Bolosky et al. | |
| 2005/0172026 A1* | 8/2005 | Jeon | H04L 29/06 709/228 |
| 2005/0220076 A1 | 10/2005 | Kokado | |
| 2006/0020688 A1 | 1/2006 | Chang et al. | |
| 2006/0075506 A1* | 4/2006 | Sanda | G06F 21/316 726/26 |
| 2006/0155672 A1* | 7/2006 | Lee | G06F 8/61 |
| 2006/0187891 A1 | 8/2006 | Sairanen | |
| 2007/0054695 A1* | 3/2007 | Huske | H04N 7/173 455/556.2 |
| 2007/0118617 A1* | 5/2007 | Lee | G06F 8/65 709/219 |

FOREIGN PATENT DOCUMENTS

| | | |
|---|---|---|
| JP | 08172437 A | 7/1996 |
| KR | 20000058858 A | 10/2000 |
| WO | 03038674 A1 | 5/2003 |

OTHER PUBLICATIONS

Communication dated Nov. 25, 2011, issued by the State Intellectual Property Office of P.R. China in counterpart Chinese Application No. 200610172986.6.

Communication dated Apr. 25, 2012 issued by the State Intellectual Property Office of P.R. China in counterpart Chinese Application No. 200610172986.6.

Acharya et al., "Balancing Push and Pull for Data Broadcast," Proceedings of ACM SIGMOD Conference, Tucson, Arizona, May 1997, (Acharya_1997.pdf; pp. 1-16).

Communication issued on Mar. 18, 2015 by the State Intellectual Property Office of PR China in related Application No. 201310060713.2.

Communication dated Dec. 1, 2015, issued by the State Intellectual Property Office of the People's Republic of China in counterpart Chinese Application No. 201310060713.2.

Communication dated May 23, 2016, issued by the State Intellectual Property Office in counterpart Chinese Application No. 201310060713.2.

* cited by examiner

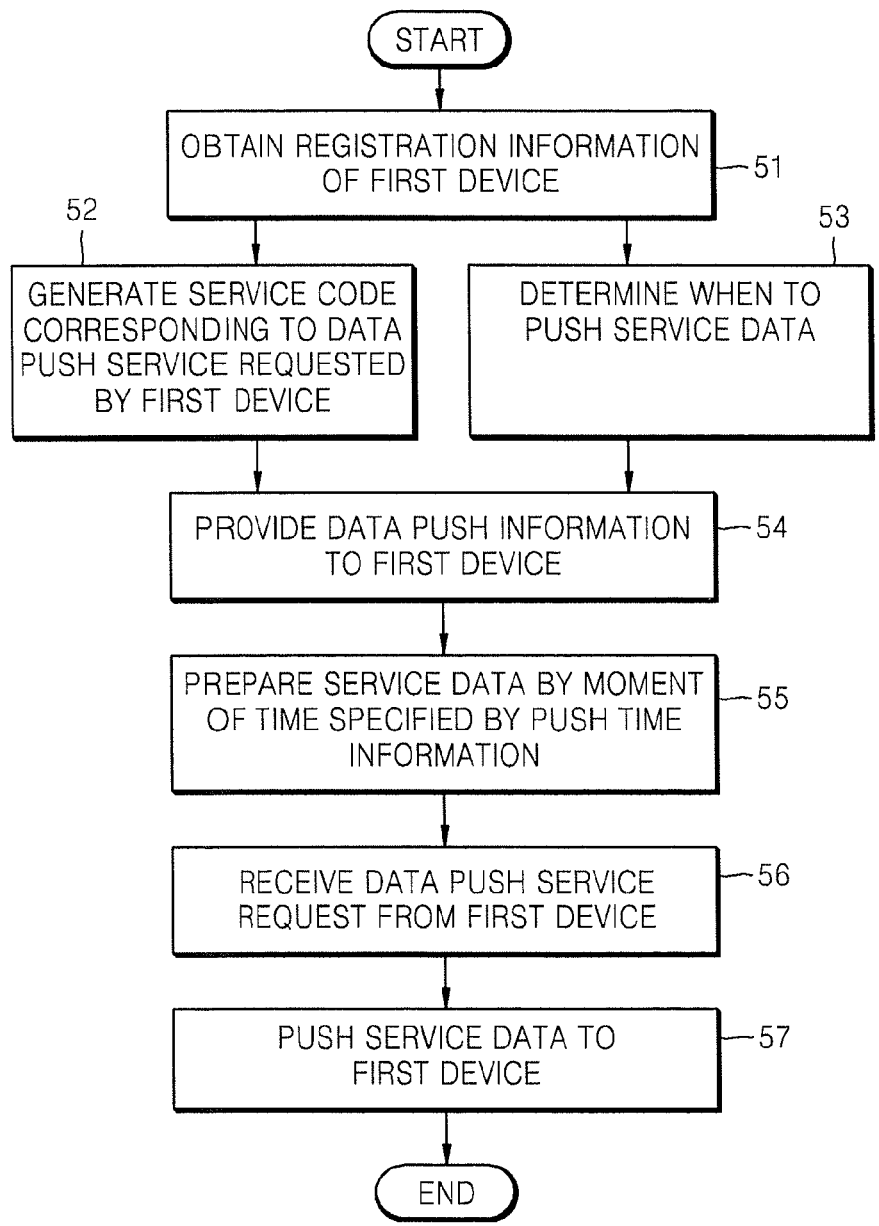

DATA PUSH SERVICE METHOD AND SYSTEM USING DATA PULL MODEL

CROSS-REFERENCE TO RELATED PATENT APPLICATION

This application is a continuation of U.S. application Ser. No. 11/542,111 filed on Oct. 4, 2006, which claims priority from Korean Patent Application No. 10-2005-0093070, filed on Oct. 4, 2005, in the Korean Intellectual Property Office, the disclosures of which are incorporated herein in their entirety by reference.

BACKGROUND OF THE INVENTION

1. Field of the Invention

Apparatuses and methods consistent with the present invention relate to providing services to a device, and more particularly, to providing a data push service to a device.

2. Description of the Related Art

Web browsers enable users to actively search for data on the Internet. However, this web browser-based search method is sometimes time-consuming and requires users to repeatedly access Internet websites to obtain up-to-date data. A method in which a user actively requests service data and then obtains the service data is referred to as a data pull method. In the data pull method, a client initiates a session for communication with a server.

By contrast, a method in which a broadcast station such as a TV broadcast station keeps transmitting service data and a user chooses one of a plurality of channels provided by the broadcast station is referred to as a data push method. In the data push method, a server initiates a session for communication with a client. TV broadcast services provided in the data push method are referred to as data push services.

FIG. 1 is a schematic diagram of a related art data service push system. Referring to FIG. 1, the related art data push service system includes first through third devices 11 through 13, a network address translation (NAT) node 14, a firewall 15, and a server 16. A data push service can be provided to at least one of the first through third devices 11 through 13 by the server 16. It will now be described how the server 16 provides a data push service to the first device 11.

The first device 11 provides information on itself to the server 16 and thus registers itself with the server 16. Thereafter, the server 16 stores the obtained information of the first device 11. The registration of the first device 11 with the server 16 is carried out during a predetermined session initiated by the first device 11.

The NAT node 14 and the firewall 15 exist between the first through third devices 11 through 13 and the server 16 and thus the devices 11 through 13 and server 16 can communicate with each other only via the NAT node 14 and the firewall 15. In detail, while the first device 11 registers itself with the server 16, the NAT node 14 translates a local IP address included in a message transmitted by the first device 11 into a global IP address with reference to the local IP address and the global IP address of the first device 11. The firewall 15 allows the transmission of service data that uses a predetermined port corresponding to a port number allotted for a data push service requested by the first device 11 and disallows the transmission of service data that uses a port other than the predetermined port.

In order that the NAT node 14 and the firewall 15 can perform the aforementioned functions properly, the first device 11 provides the NAT node 14 and the firewall 15 with information including the local IP address and the global IP address of the first device 11 and the port number allotted for the requested data push service. A local IP address is an address used in a local network and is also referred to as a private IP address. A global IP address is an address used in a global network and is also referred to as a public IP address.

Thereafter, if service data to be pushed to the first device 11 is generated, the server 16 pushes the service data to the first device 11 with reference to the information of the first device 11 stored therein. This data push service operation is carried out during a predetermined session initiated for a data push service. While the server 16 pushes the service data to the first device 11, the NAT node 14 translates a global IP address included in a message transmitted by the server 16 into a local IP address with reference to the local IP address and the global IP address of the first device 11, and the firewall 15 allows the transmission of service data that uses the predetermined port and disallows the transmission of service data that uses a port other than the predetermined port.

In order that the NAT node 14 and the firewall 15 can perform the aforementioned functions properly, the server 16 provides the NAT node 14 and the firewall 15 with the information of the first device 11 including the local IP address and the global IP address of the first device 11 and the port number allotted for the requested data push service.

The server 16 must provide the information of the first device 11 to the NAT node 14 and the firewall 15 whenever it wishes to push service data to the first device 11. Therefore, the server 16 must maintain and manage the information of the first device 11. However, since the server 16 serves a plurality of devices including the first device 11, the maintenance and management of information of all the devices results in a considerable load on the server 16. In addition, the greater the number of devices that the server 16 need to push service data to, the larger the amount of information that the server 16 must manage. For this, the storage capacity of the server 16 may have to be increased frequently.

The NAT node 14 translates an address for a session initiated by a client. However, in order that the NAT node 14 can translate an address for a session initiated by a server, the NAT node 14 must be equipped with an additional function that enables the NAT node to translate an address included in a message transmitted by the server. Also, most web servers provides service through a port number 80. In addition, in order that the firewall 15 can prevent the transmission of service data, a network administrator must allot a predetermined port number exclusively for the data push service requested by the device 11.

In order for a server to provide data push services to clients, network infrastructure capable of meeting the aforementioned requirements must be established. However, the establishment of such network infrastructure is costly. Therefore, currently, the application of data push services is limited to areas such as corporation markets or large-scale business-to-business (B2B) housing complexes.

SUMMARY OF THE INVENTION

The present invention provides a data push service method and system which do not require a server to maintain and manage information of devices and do not require the establishment of network infrastructure as is needed in related art data push service techniques.

The present invention also provides a computer-readable medium storing a computer program for executing the data push service method.

According to an aspect of the present invention, there is provided a service data push method including: providing a device with data push information regarding service data to be pushed to at least one device; and pushing the service data to the device when receiving a data push service request from the at least one device.

According to another aspect of the present invention, there is provided a server including: a push information providing unit which provides a device with data push information regarding service data to be pushed to at least one device; and a service data push unit which pushes the service data when receiving a data push service request from the device which has obtained the data push information.

According to another aspect of the present invention, there is provided a computer-readable medium storing a computer program for executing the service data push method described above.

According to another aspect of the present invention, there is provided a service data processing method including: obtaining data push information regarding service data to be pushed from a server; issuing a data push service request to the server with reference to the data push information; and receiving the service data in return for the data push service request and processing the received service data.

According to another aspect of the present invention, there is provided a device including: a push information obtaining unit which obtains data push information regarding service data to be pushed from a server; a service request unit which issues a data push service request to the server with reference to the data push information; and a service data processing unit which receives service data pushed by the server in return for the data push service request and processes the received service data.

According to another aspect of the present invention, there is provided a computer-readable medium storing a computer program for executing the service data processing method described above.

According to another aspect of the present invention, there is provided a data push service system including: a server which provides a device with data push information regarding service data to be pushed to at least one device; and the device which obtains the data push information from the server and issues a data push service request to the server with reference to the obtained data push information, wherein the server pushes the service data to the at least one device when receiving the data push service request from the at least one device.

BRIEF DESCRIPTION OF THE DRAWINGS

The above and other features of the present invention will become more apparent by describing in detail exemplary embodiments thereof with reference to the attached drawings in which:

FIG. 5 is a flowchart illustrating a data push service method according to an exemplary embodiment of the present invention.

DETAILED DESCRIPTION OF EXEMPLARY EMBODIMENTS OF THE INVENTION

The present invention will now be described more fully with reference to the accompanying drawings in which exemplary embodiments of the invention are shown.

Figure 1:
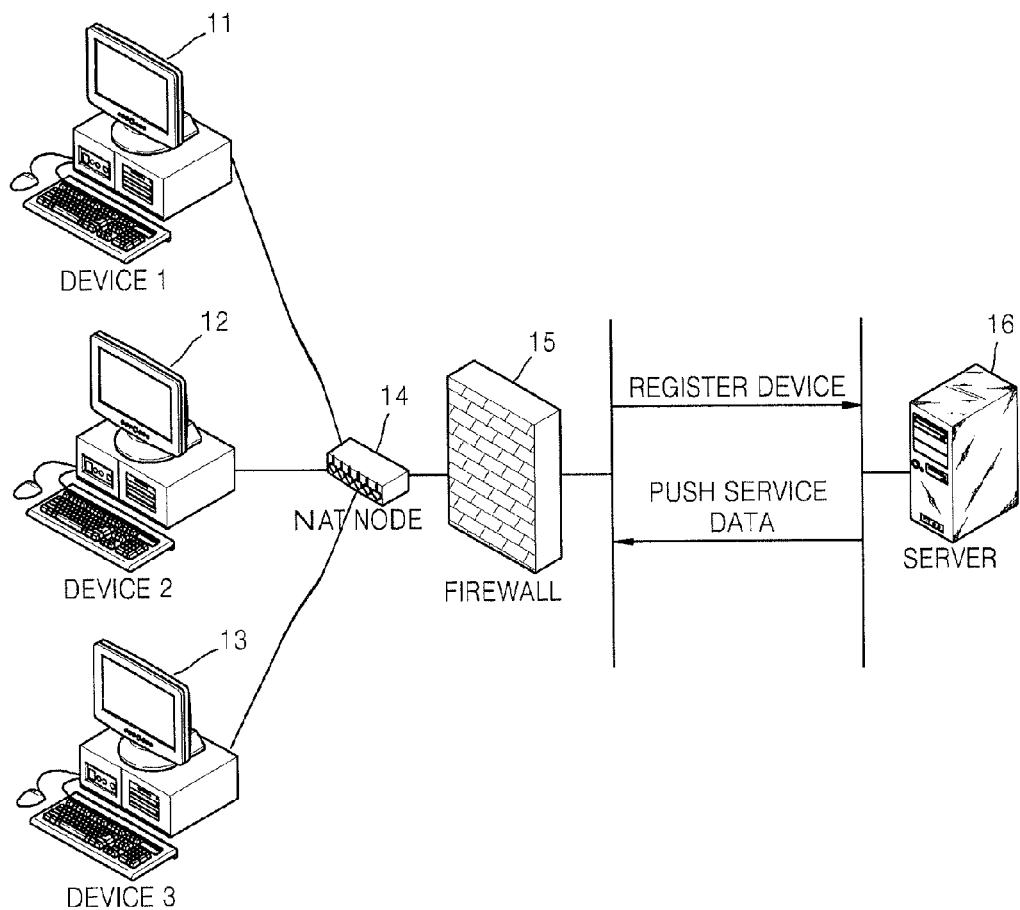
FIG. 1 is a schematic diagram of a related art data push service system.
Figure 2:
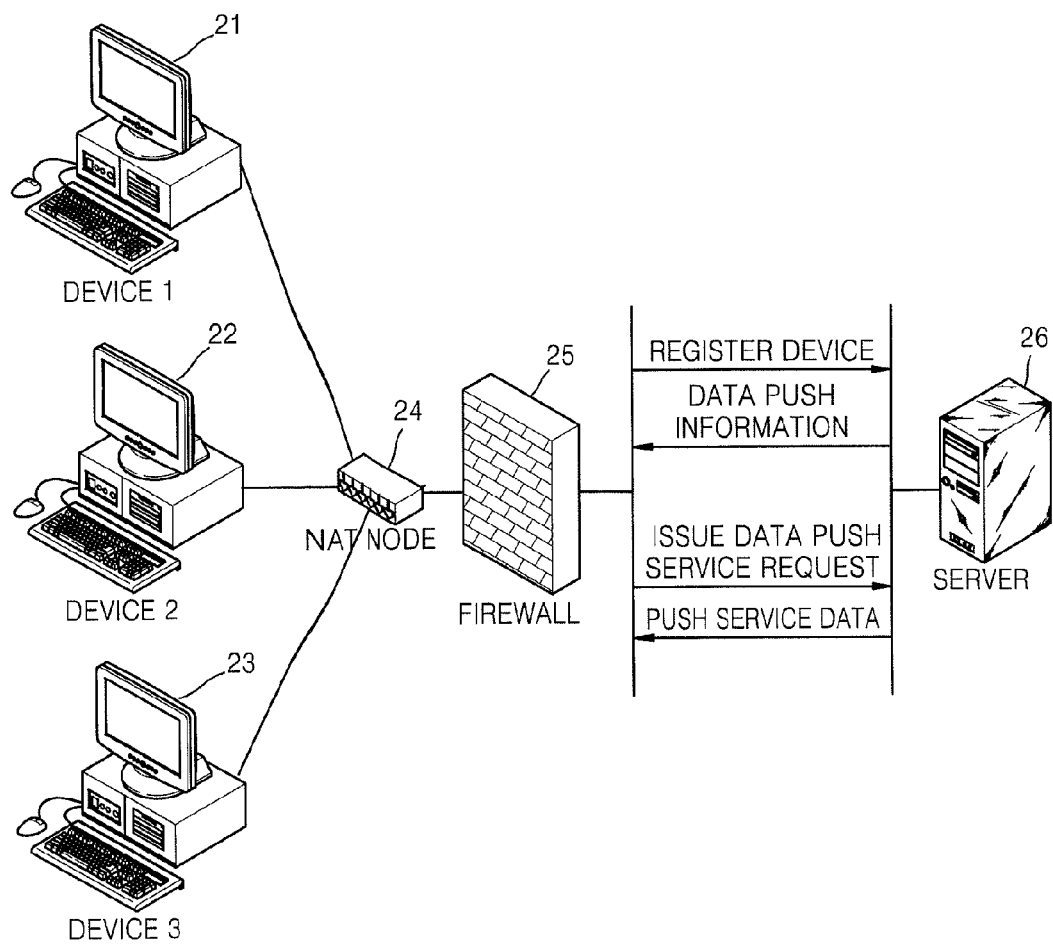
FIG. 2 is a schematic diagram of a data push service system according to an exemplary embodiment of the present invention.

FIG. 2 is a schematic diagram of a data push service system according to an exemplary embodiment of the present invention. Referring to FIG. 2, the data push service system includes first through third devices 21 through 23, a network address translation (NAT) node 24, a firewall 25, and a server 26. A data push service may be provided to at least one of the first through third devices 21 through 23 by the server 26. It will now be described how the server 26 provides a data push service to the first device 21. It is obvious to one of ordinary skill in the art that the server 26 can provide a data push service to an arbitrary device other than the first device 21.

The first device 21 provides registration information on itself to the server 26 and thus registers itself with the server 26 (The server 26 thus obtains the registration information on the first device 21. Thereafter, the server 26 generates data push information regarding service data to be pushed based on the registration information of the first device 21 and provides the data push information to the first device 21.

The registration of the first device 21 with the server 26 and the obtaining of the data push information by the first device 21 are carried out during a first session initiated by the first device 21 for registering the first device 21 with the server 26.

Thereafter, the first device 21 issues a data push service request to the server 26 with reference to the data push information. Then the server 26 pushes service data in response to the data push service request issued by the first device 21. The first device 21 processes the service data pushed by the server 26 using a method predefined by a data push service requested by the first device 21.

The issuance of the data push service request and the processing of the service data by the first device 21 are carried out during a second session initiated by the first device 21 for obtaining service data from the server 26.

In a data pull method, a device initiates a session, while, in a data push method, a server initiates a session. According to the current exemplary embodiment of the present invention, however, the first device 21 initiates a session for a data push service. Therefore, the data push service system according to the current exemplary embodiment of the present invention may be regarded as a data push service system using the data pull method.

While data is transmitted from the first device 21 to the server 26 in order to register the first device 21 with the server 26 or in order for the first device 21 to issue a data push service request to the server 26, the NAT node 24 translates a local IP address included in the data into a global IP address with reference to a local IP address and a global IP address of the first device 21, and the firewall 25 allows transmission of service data that uses a predetermined port corresponding to a port number allotted for the requested data push service and disallows transmission of service data that uses a port other than the predetermined port.

In order that the NAT node 24 and the firewall 25 can perform the aforementioned functions properly, the first device 21 must provide the NAT node 24 and the firewall 25 with the information of the first device 21 including the local IP address and the global IP address of the first device 21 and the port number allotted for the requested data push service.

When data is transmitted from the server 26 to the first device 21 in order for the server 26 to provide the data push information to the first device 21 or to push service data to the first device 21, the NAT node 24 translates a global IP address included in the data into a local IP address with reference to the local IP address and the global IP address of the first device 21, and the firewall 25 allows transmission of service data that uses the predetermined port and disallows transmission of service data that uses a port other than the predetermined port.

In order for the NAT node 24 and the firewall 25 to perform the aforementioned functions properly, the server 26 must provide the NAT node 24 and the firewall 25 with the information of the first device 21 including the local IP address and the global IP address of the first device 21 and the port number allotted for the requested data push service.

Figure 3:
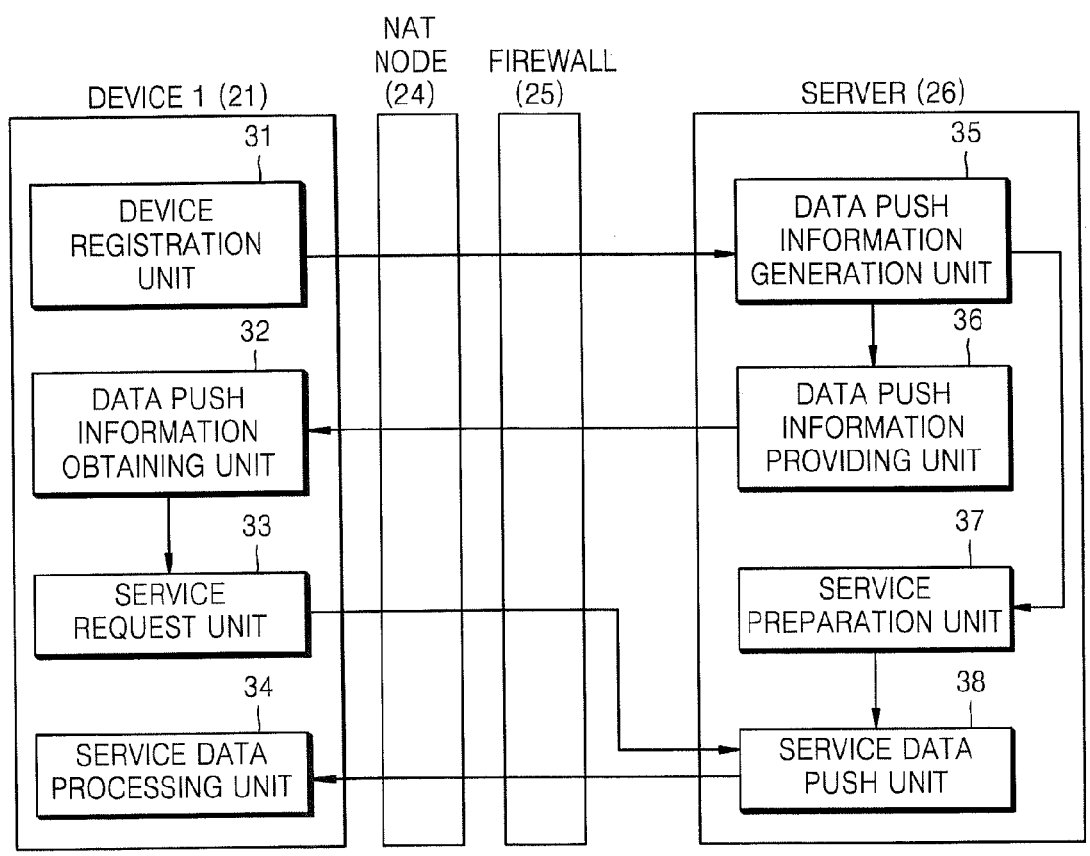
FIG. 3 is a block diagram of a first device and a server of the data push service system illustrated in FIG. 2 according to an exemplary embodiment of the present invention.

FIG. 3 is a detailed block diagram of the first device 21 and the server 26 of the data push service system illustrated in FIG. 2 according to an exemplary embodiment of the present invention. Referring to FIG. 3, the first device 21 includes a device registration unit 31, a data push information obtaining unit 32, a service request unit 33, and a service data processing unit 34.

The device registration unit 31 initiates a first session for registering the first device 21 with the server 26. During the first session, the first device 21 transmits a message including registration information of the first device 21 to the server 26. Here, the registration information of the first device 21 is information needed for providing data push information to the first device 21 and comprises data push service information regarding a data push service requested by the first device 21 and information of the first device 21. The information of the first device 21 comprises a local IP address and a global IP address of the first device 21, and a port number allotted for the requested data push service.

The data push information obtaining unit 32 obtains data push information from a message transmitted by the server 26 which has received the registration information of the first device 21 from the data registration unit 31. The data push information is the push information for service data to be pushed to the first device 21 by the server 26 and comprises push time information specifying when the service data is to be pushed to the first device 21 and a predetermined data push service code showing data push service.

The service request unit 33 initiates a second session for obtaining service data from the server 26. During the second session, the service request unit 33 issues a data push service request to the server 26 with reference to the data push information obtained by the data push information obtaining unit 32. In detail, while the data push information obtaining unit 32 obtains the data push information from the server 26, the service request unit 33 is in a standby mode until a time specified by the push time information included in the data push information and transmits a message containing service request information to the server 26 at the time specified by the push time information, thereby issuing a data push service request to the server 26.

The service request information is information required by the server 26 to push service data to the first device 21 and comprises a service code corresponding to the requested data push service and the information of the first device 21. The information of the first device 21 comprises the local IP address and the global IP address of the first device 21 and the port number allotted for the requested data push service. Since the service request information comprises the information of the first device 21, the information of the first device 21 is provided to the server 26 whenever the service request unit 33 issues a data push service request to the server 26. Therefore, according to the current exemplary embodiment of the present invention, unlike in the related art, the server 26 does not need to maintain and manage the information of the first device 21.

The service data processing unit 34 receives the service data pushed by the server 26 in return for the data push service request issued by the service request unit 33 and processes the received service data using a method predefined by the requested data push service. A data push service is a service provided unilaterally by the server 26 and may include a TV broadcast service in which media content is consecutively transmitted by a TV broadcast station and an emailing service in which email is transmitted by an email server even when not requested by a user. In other words, the service data processing unit 34 may reproduce media content transmitted by a TV broadcast station or output email transmitted by an email server to a user.

Referring to FIG. 3, the server 26 includes a data push information generation unit 35, a data push information providing unit 36, a service preparation unit 37, and a service data push unit 38.

During the first session initiated by the device registration unit 31 of the first device 21, the data push information generation unit 35 obtains registration information of the first device 21 from the first device 21 and generates data push information based on the registration information of the first device 21 while the first device 21 registers itself with the server 26. The registration information of the first device 21 is information required for providing data push information to the first device 21 and comprises the data push service information regarding the requested data push service and information of the first device 21. The information of the first device 21 comprises the local IP address and the global IP address of the first device 21, and the port number allotted for the requested data push service. The data push information is the push information for service data to be pushed to the first device 21 by the server 26 and comprises push time information specifying when the service data is to be pushed to the first device 21 and a predetermined data push service code showing data push service.

In detail, while the first device 21 registers itself with the server 26, the data push information generation unit 35 generates the predetermined data push service code with reference to the data push service information and allots the predetermined data push service code to the requested data push service so that the requested data push service can be identified by the predetermined data push service code. The data push information generation unit 35 determines when to push service data and generates the push time information based on the determination result. In detail, while the first device 21 registers itself with the server 26, the data push information generation unit 35 calculates the amount of time required to generate service data for the requested data push service and determines when to push the service data based on the calculation result.

The data push information providing unit 36 provides the data push information generated by the data push information generation unit 35 to the first device 21 by transmitting a message containing the data push information to the first device 21. In detail, the data push information providing unit 36 provides the predetermined data push service code and the push time information generated by the data push information generation unit 35 to the first device 21 by transmitting a message containing the predetermined data push service code and the push time information to the first device 21.

During the second session initiated by the service request unit 33 of the first device 21, the service preparation unit 37 prepares service data so that the service data can be pushed at a predetermined time specified by the push time information generated by the data push information generation unit 35. In detail, the service preparation unit 37 completes the generation of service data to be pushed to the first device 21 by the predetermined time specified by the push time information generated by the data push information generation unit 35.

During the second session, the service data push unit 38 pushes the service data prepared by the service preparation unit 37 to the first device 21 when receiving the data push service request issued by the first device 21. In other words, the service data push unit 38 pushes the service data prepared by the service preparation unit 37 to the first device 21 as soon as it receives from the first device 21 the data push service request issued with reference to the push time information provided by the data push information providing unit 36.

In detail, the service data push unit 38 receives a message containing the service request information from the first device 21 which has obtained the data push information from the data push information providing unit 36, thereby receiving the data push service request issued by the first device 21. The service request information is information required by the server 26 to push service data to the first device 21 and comprises the predetermined data push service code corresponding to the requested data push service and the information of the first device 21. The information of the first device 21 comprises the local IP address and the global IP address of the first device 21, and the port number allotted for the requested data push service.

Therefore, the service data push unit 38 pushes the service data prepared by the service preparation unit 37 to the first device 21 with reference to the service request information. In detail, the service data push unit 38 pushes service data corresponding to the data push service designated by the predetermined service code to a device having the global IP address included in the service request information, i.e., the first device 21, via a port corresponding to the port number included in the service request information.

Figure 4:
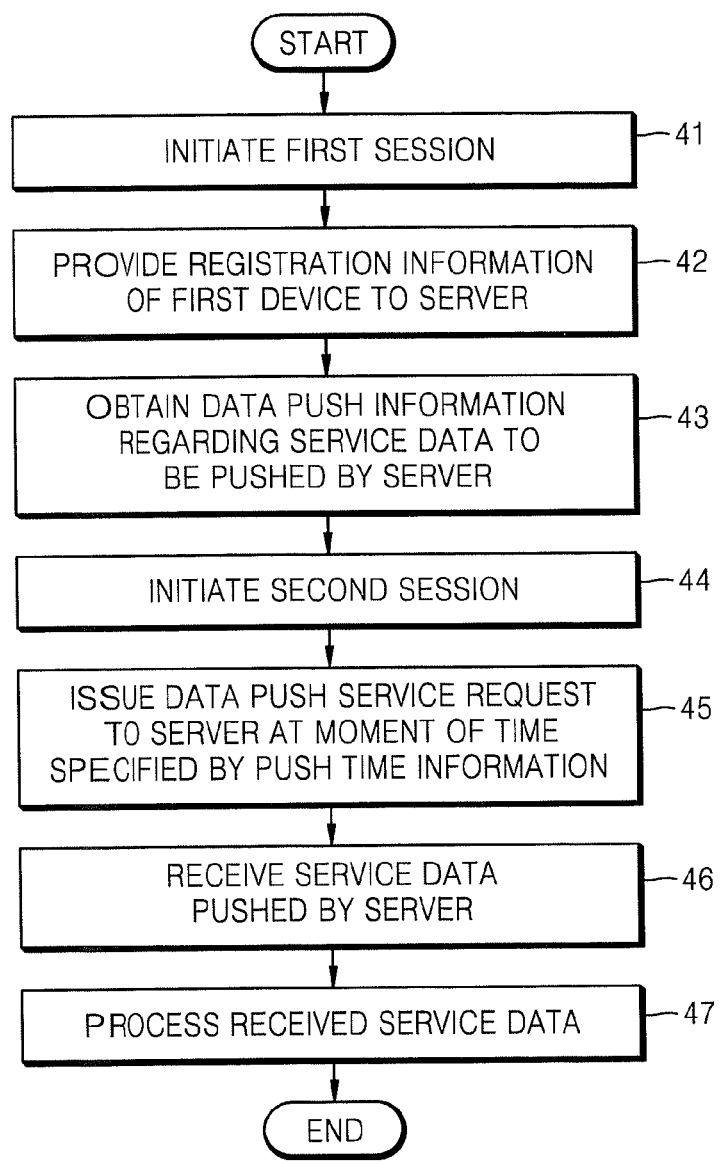
FIG. 4 is a flowchart illustrating a service data processing method according to an exemplary embodiment of the present invention.

FIG. 4 is a flowchart illustrating a service data processing method according to an exemplary embodiment of the present invention. Referring to FIG. 4, the service data processing method comprises a plurality of operations performed by the first device 21 illustrated in FIG. 3. Therefore, the description of the first device 21 detailed above with reference to FIG. 3 directly applies to the service data processing method according to the current exemplary embodiment of the present invention.

In operation 41, the first device 21 initiates a first session for registering itself with the server 26.

In operation 42, during the first session, the first device 21 transmits a message containing registration information of the first device 21 to the server 26, thereby providing the registration information of the first device 21 to the server 26.

In operation 43, during the first session, the first device 21 receives a message containing data push information from the server 26 which has received the registration information of the first device 21, thereby obtaining the data push information.

In operation 44, the first device 21 initiates a second session for obtaining service data from the server 26.

In operation 45, during the second session, the first device 21 issues a data push service request to the server 26 with reference to the data push information. In detail, in operation 45, the first device 21 is in a standby mode until a time specified by push time information included in the data push information and transmits a message containing service request information to the server 26 at the time specified by the push time information, thereby issuing a data push service request to the server 26.

In operation 46, during the second session, the first device 21 receives service data pushed by the server 26 in response to the data push service request issued in operation 45 by the first device 21.

In operation 47, during the second session, the first device processes the received service data using a method predefined by a data push service requested by the first device 21.

FIG. 5 is a flowchart illustrating a service data push method according to an exemplary embodiment of the present invention. Referring to FIG. 5, the service data push method comprises a plurality of operations performed by the server 26 illustrated in FIG. 3. Thus, the description of the server 26 detailed above with reference to FIG. 3 directly applies to the service data push method according to the current exemplary embodiment of the present invention.

In operation 51, during a first session initiated by the first device 21, the server 26 obtains registration information of the first device 21 from the first device 21 while the first device 21 registers itself with the server 26.

In operation 52, during the first session, the server 26 generates service code with reference to data push service information included in the registration information of the first device 21 and allots the service code to a data push service so that the data push service can be identified by the service code.

In operation 53, during the first session, the server 26 determines when to push service data and generates push time information based on the determination result. In detail, in operation 53, the server 26 calculates the amount of time required to generate service data corresponding to a data push service requested by the first device 21 with reference to the data push service information and determines when to push the service data.

In operation 54, during the first session, the server 26 transmits to the first device 21 a message containing data push information that comprises the service code generated in operation 52 and the push time information generated in operation 53, thereby providing the data push information to the first device 21.

In operation 55, during a second session initiated by the first device 21, the server 26 prepares the service data by a time specified by the push time information. In detail, in operation 55, the server 26 completes the generation of the service data by the time specified by the push time information.

In operation 56, during the second session, the server 26 receives a data push service request from the first device 21 that has obtained the data push information transmitted in operation 54 by the server 26. In detail, in operation 56, the server 26 receives a message containing service request information from the first device 21, thereby receiving a data push service request from the first device 21.

In operation 57, during the second session, the server 26 pushes the service data to the first device 21 as soon as it receives the message transmitted with reference to the push time information by the first device 21.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet).

According to the present invention, a server receives information of a device whenever it pushes service data to the device using a data pull method. Accordingly, the server does not need to maintain and manage the information of the device. Thus, it is possible to reduce the load of the server, and there is no need to frequently increase the storage capacity of the server.

In addition, according to the present invention, the server pushes service data using the data pull method and thus does not need special network infrastructure as is needed in the related art. Therefore, it is possible to provide data push services not only to such areas as corporate markets or large-scale B2B housing complexes but also to such areas as homes where ordinary network infrastructure such as a very high bit rate digital subscriber line (VDSL) network is established.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A service data push method comprising:
   initiating a first session between a device, to which service data is to be pushed, and a server, wherein the first session is initiated by the device that transmits a first data push service request;
   initiating a second session, which is a push data session, between the device and the server, by transmitting, from the device, a second data push service request to the server based on data push information received in the first session regarding the service data to be pushed by the server in the second session, wherein the second data push service request includes address information of the device; and
   receiving, at the device, the service data pushed by the server in the second session after the initiating of the first session, based on the address information included in the second data push service request,
   wherein the data push information is provided to the device in the first session and prior to the second data session, and
   wherein the server transmits the service data to the device based on the address information provided by the device and the server does not maintain the address information of the device between the first session and the second session,
   wherein the data push information comprises a service code corresponding to a data push service requested by the device, and the service data pushed by the server is a service corresponding to the data push service identified by the service code included in the data push service request, and
   wherein the server calculates amount of time required for generating service data for the requested data push service and the data push information comprises time information determined based on the calculated time.

2. The service data push method of claim 1, wherein the data push information provided in the first session comprises push time information specifying when to push the service data, and
   wherein the service data is pushed by the server as soon as the second data push service request issued based on the push time information is received from the device.

3. The service data push method of claim 2, further comprising storing the data push information in the device, before initiating the second session.

4. The service data push method of claim 2, further comprising:
   preparing the service data by a predetermined time specified by the push time information; and
   pushing, from the server, the prepared service data to the device as soon as the data push service request issued based on the push time information is received from the device.

5. The service data push method of claim 1,
   wherein the first session and the second session are initiated by the device, wherein the device sends a first message which starts communication between the device and the server, the first message is the first data push request in the first session and the second data push requests in the second session.

6. The service data push method of claim 1, wherein the data push service request comprises service request information including a port number allotted for a data push service requested by the device, and the received service data via a predetermined port corresponding to a port number allotted for the requested data push service.

7. The service data push method of claim 1, wherein the service data of the server is provided to the device based on a data push means using a data pull means.

8. The service data push method of claim 1, wherein communications with the server comprising establishing a session with the server, are initiated by a first request from the device.

9. A server comprising:
   a memory storing computer-executable instructions; and
   a processor configured to execute the stored instructions comprising:
   responding to an initial request from at least one remote device with data push information regarding service data to be pushed to the at least one remote device, wherein the initial request is a message including registration information of the at least one device in a first session initiated by the at least one remote device; and
   receiving a data push service request from the at least one remote device which has obtained the data push information and push the service data to the at least one device after initiating a second session which is a push data session, based on address information of the at least one remote device included in the data push service request,
   wherein the data push information is provided to the device in the first session and prior to the second session, and
   wherein the server transmits the service data to the remote device based on the address information provided by the remote device and the server does not maintain the address information of the at least one remote device between the first session and the second session,
   wherein the data push information comprises a service code corresponding to a data push service requested by the remote device, and the service data pushed by the server is a service corresponding to the data push service identified by the service code included in the data push service request, and
   wherein the server calculates amount of time required for generating service data for the requested data push service and the data push information comprises time information determined based on the calculated time.

10. The server of claim 9, wherein the stored instructions further comprise:
    generating the data push information based on the registration information of the at least one remote device provided in the first session; and receiving the data push service request from the at least one device and prepare the service data for the service data push unit.

11. A device comprising:
a memory storing computer-executable instructions; and
a processor configured to execute the stored instructions comprising:
obtaining data push information regarding service data to be pushed from a server by initiating a preliminary session with the server in which a message including registration information of the device is transmitted to the server, wherein the device initiates communication with the server by first transmitting the message to the server;
issuing a data push service request including address information of the device and transmitting the data push service request to the server based on the data push information to initiate a data push session; and
receiving service data pushed by the server obtaining the address information after initiating the push data session, in return for the data push service request and process the received service data,
wherein the data push information is provided to the device in the preliminary session prior to the push data session,
wherein the server transmits the service data to the device based on the address information provided by the device and the server does not maintain the address information of the device between the preliminary session and the push data session,
wherein the data push information comprises a service code corresponding to a data push service requested by the device, and the service data pushed by the server is a service corresponding to the data push service identified by the service code included in the data push service request, and
wherein the server calculates amount of time required for generating service data for the requested data push service and the data push information comprises time information determined based on the calculated time.

12. The device of claim 11, wherein the stored instructions further comprise registering the device with the server in the preliminary session, wherein the server generates the data push information.

13. The device of claim 11, wherein the data push service request comprises service request information including a port number allotted for a data push service requested by the device, and the received service data via a predetermined port corresponding to a port number allotted for the requested data push service.

14. A data push service system comprising:
a server configured to provide a device with data push information comprising timing of a push service in a preliminary session between the device and the server, and transmit service data to be pushed to the device in response to a data push request from the device;
wherein the device is configured to initiate a push data session with the server for pushing the service data, transmit the data push service request to the server based on the data push information received in the preliminary session, and receive the service data pushed by the server in response to the transmitted data push service request, and the server transmits the service data based on address information of the device included in the data push service request after initiating the push data session,
wherein the data push information is provided to the device in the preliminary session prior to the push data session,
wherein the server transmits the service data to the device based on the address information provided by the device and the server does not maintain the address information of the device between the preliminary session and the data push session,
wherein the server comprises at least one hardware component,
wherein the data push information comprises a service code corresponding to a data push service requested by the device, and the service data pushed by the server is a service corresponding to the data push service identified by the service code included in the data push service request, and
wherein the server calculates amount of time required for generating service data for the requested data push service and the data push information comprises time information determined based on the calculated time.

15. The data push service system of claim 14, wherein the server provides a data push service in the data push session at an initial request of the device.

16. The data push service system of claim 15, wherein the initial request is not a response to any messages from the server and wherein the device provides a local internet protocol (IP) address and a global IP address and a port number of the device with the first request and with the second request.

* * * * *